United States Patent Office 3,454,780
Patented July 8, 1969

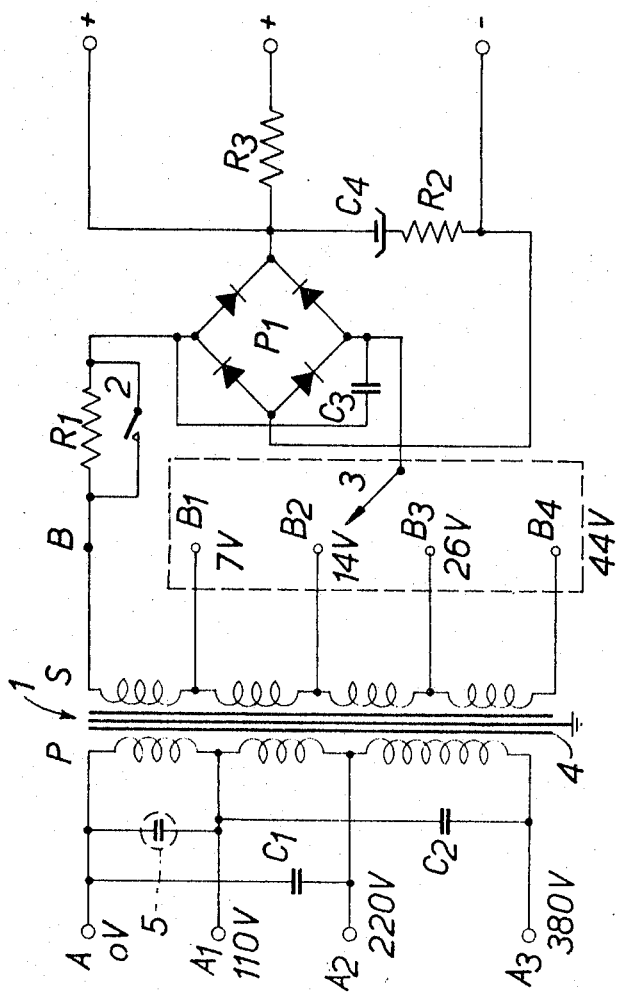

3,454,780
MULTI-PURPOSE ELECTRICAL
POWER APPARATUS
Adolphe Cominassi, Fontoy, and Etienne Danko, Morlange, France, assignors to Mobelec Societe Anonyme Holding, Luxembourg-Ville, Luxembourg, a corporation of Luxembourg
Filed Feb. 2, 1967, Ser. No. 613,504
Claims priority, application Luxembourg, Sept. 14, 1966, 51,967
Int. Cl. H02j 3/00, 5/00; H02p 13/06
U.S. Cl. 307—17
9 Claims

ABSTRACT OF THE DISCLOSURE

An adjustable source of electrical power which operates off a standard alternating current supply. The apparatus is characterized by compactness, high reliability and the ability to provide either or both an alternating current output voltage differing from the supply voltage and/or a direct current output voltage. The magnitude and type of output voltage is determined by manipulation of switches and proper selection of a pair of the plurality of output terminals. The alternating current output is derived via transformer or auto-transformer action and its magnitude may be varied by tap changing. The direct current output is generated by a rectifier bridge and may be varied in magnitude in several ways.

BACKGROUND OF THE INVENTION

Field of the invention

The present invention relates to a multi-purpose electrical apparatus and more particularly to an electrical apparatus forming a source of alternating current as well as of direct current at different voltages.

Description of the prior art

It is known that workshops and even private people often require an electrical apparatus which will occupy little space and which will enable them to convert the mains voltages at their disposal, in order to be able to carry out various tasks separately or simultaneously. In the prior art, a single piece of equipment which would operate off the commonly available A.C. supply and permit the selection of either an A.C. voltage differing from the supply voltage or a D.C. voltage has not been available. Accordingly, those in need of such flexibility were required to acquire both A.C. and D.C. power supplies which, in most cases, were individually much more sophisticated than necessary and, in view of their complexity, expensive and of comparatively poor reliability.

SUMMARY OF THE INVENTION

The multi-purpose electrical apparatus covered by the present invention comprises, in particular, a current rectifying circuit with semiconductor elements, a transformer having a plurality of taps on both its primary and secondary windings and switch means. These elements are interconnected to form a source of alternating current and direct current at different voltages.

Further characteristics of the invention, enabling the constructional details of the apparatus covered by it and the advantages resulting from it to be understood more clearly, will emerge from the following description of a practical example, given by way of information and without any limitative effect.

BRIEF DESCRIPTION OF THE DRAWING

In the attached drawing, the diagram constitutes a schematic circuit diagram of a preferred embodiment of an electrical apparatus in accordance with the invention.

DESCRIPTION OF THE PREFERRED EMBODIMENT

The apparatus illustrated comprises a core transformer 1 including a primary winding P and a secondary winding S. The primary winding P of the transformer 1 is subdivided into a number of parts having the taps A, A1, A2 and A3, which correspond to the voltages 0, 110, 220 and 380 v. Anti-parasite and balancing condensers C1 and C2 are connected between the taps A and A2 and between the taps A1 and A3 respectively of the primary P of the transformer 1. A signal lamp 5 is connected between the ingoing terminals A and A1 of the transformer 1.

The secondary S of the transformer 1 is subdivided into a number of parts having the taps B, B1, B2, B3 and B4, corresponding to voltages of 0, 7, 14, 26 and 44 v. The core 4 of the transformer 1 is preferably made of a sheet metal for high-grade transformer, having no remanence. The insulation of the various windings of the transformer 1 is arranged in such a manner that a temperature rise above 150° C. presents no danger to the transformer. By selecting the appropriate materials and by very accurate winding, an efficiency of 86–88% can thus be obtained.

By means of a switch 3, the taps B1, B2, B3 and B4 of the secondary S of the transformer 1 can be connected to one of the input terminals of a current rectifier bridge P1. The other terminals of the rectifier bridge P1 are connected via a protection resistance R1 to the tap B of the secondary S of the transformer 1. A switch 2 is provided, to enable the resistance R1 to be short-circuited.

In the diagram, the current-rectifying bridge P1 consists of four semi-conductor diodes of the same type, each connected into a branch of the bridge. Needless to say, one or two of these diodes can be replaced by a control semi-conductor element, such as a thyristor. In this case, the intensity of the output current of the bridge P1 can be steplessly varied.

A condenser C3 is connected between the two input terminals of the rectifier bridge P1, in order to protect the semi-conductor diodes of the bridge against reverse voltages.

The output terminals of the rectifier bridge P1 can be connected, either direct or via a current-limiting resistance R3, to an exploitation circuit. An RC element, consisting of a condenser C4 and a resistance R2 and serving to maintain the rectified output peak voltage of the bridge is connected between the output terminals of the rectifier bridge P1. This RC element facilitates the striking of the arc, for example, if the apparatus is used as a source of current for a welding apparatus.

As may be seen from the diagram, the apparatus covered by the invention can be used, in one possible application, as an auto-transformer for voltages of 110, 220 and 380 v., taken from the taps A of the primary P of the transformer 1. In a second possible application, the apparatus operates as a safety transformer, e.g. of voltages of 7, 14, 26 and 44 v., which can be taken from the taps B of the transformer 1.

A third possible application, the apparatus to which the invention relates operates as a rectifier with two alterations. In this method the switch 3 enables the input voltages of the rectifier bridge P1 to be varied, consequently enabling the rectified output voltages to be varied likewise. The intensity of the output current can be selected by using either the direct output terminals or those connected to the rectifier bridge via the resistance R3. In this application, the apparatus to which the invention relates can serve as a source of direct current at various voltages, e.g. for an electric arc welding apparatus, for valvanoplastic and electrolytic purposes, for the charging of accumulators or for starting explosion-type motors etc., to give only a few examples. When short-circuiting the resistance R2 by means of the switch 2, the apparatus covered by the invention constitutes, in this application, a source of D.C. for the rapid charging of accumulators and for the rapid starting of explosion-type motors.

If the diodes of two opposite branches of the rectifier bridge P1 are replaced by semi-conductor control elements, the intensity of the output direct current can be steplessly varied.

The electrical apparatus to which the invention relates can thus be used for a variety of purposes, this being one of its essential advantages. A further advantage of the apparatus covered by the invention resides in its simplicity, its high efficiency, its robustness, its great compactness and the ease with which it can be handled. The fact is that in one constructional version the electrical components described in the foregoing were successfully incorporated in a metal box of which the dimensions did not exceed 20 x 12 x 12 cm.

A further essential advantage of the apparatus covered by the invention results from the fact that it enables the user to supply a number of alternating and/or direct voltages separately or simultaneously.

Although a preferred constructional version of an apparatus in accordance with the invention has been illustrated and described, it can undergo numerous modifications without departing from the scope of the invention, so that it has merely been given by way of an example, without any limitative effect.

We claim:
1. A power supply comprising:
   a transformer having primary and secondary windings, said primary winding having at least one intermediate tap;
   at least three alternating current terminals, said terminals respectively connected to the first end, intermediate tap and second end of said primary winding, a pair of said alternating current terminals serving as the power input terminals for the power supply, the third of said terminals and one of said pair of terminals serving as a first pair of alternating current output terminals;
   rectifier means having a pair of input and a pair of output terminals;
   means connecting the input terminals of said rectifier means across at least a portion of said secondary winding;
   a pair of direct current output terminals; and
   means connecting each of the output terminals of said rectifier means to one of said direct current output terminals.
2. The apparatus of claim 1 wherein said transformer secondary winding has at least one intermediate tap and said apparatus further comprises:
   three isolated alternating current output terminals; and
   means respectively connecting said three isolated alternating current output terminals to the first end, intermediate tap and second end of said transformer secondary winding.
3. The apparatus of claim 2 wherein said means connecting the input terminals of said rectifier means across at least a portion of said secondary winding comprises:
   means connecting a first input terminal of said rectifier means to a first end of said secondary winding; and
   switch means for selectively connecting the second input terminal of said rectifier means to said secondary winding intermediate tap or to the second end of said secondary winding.
4. The apparatus of claim 3 wherein said rectifier means comprises:
   a bridge circuit including at least a pair of solid state rectifier devices of like type.
5. The apparatus of claim 4 further comprising:
   means connected between said first end of said secondary winding and said first input terminal of said rectifier bridge for limiting the current delivered to a load connected across the direct current output terminals.
6. The apparatus of claim 5 further comprising:
   means for selectively short circuiting said current limiting means.
7. The apparatus of claim 4 further comprising:
   a third direct current output terminal; and
   means including a current limiting resistor connecting said third direct current output terminal to an output terminal on said rectifier bridge.
8. The apparatus of claim 7 further comprising:
   a second current limiting resistor connected between a first end of said secondary winding and said first input terminal of said rectifier bridge for limiting the current delivered to a load connected across a pair of said direct current output terminals; and
   means for selectively short circuiting said second current limiting resistor.
9. The apparatus of claim 8 further comprising:
   means including a capacitor connected between the output terminals of said bridge circuit for maintaining the output voltage in the event of the application of a momentary short circuit across said output terminals.

References Cited

UNITED STATES PATENTS 3,200,325  8/1965  Shuzo Takeda _____ 323—43.5
3,384,803  5/1968  Harden et al. _____ 321—2

ROBERT K. SCHAEFER, *Primary Examiner.*

H. J. HOHAUSER, *Assistant Examiner.*

U.S. Cl. X.R.

323—43.5